United States Patent [19]

Shaputis

[11] 4,068,106
[45] Jan. 10, 1978

[54] WELDING APPARATUS

[76] Inventor: John Shaputis, Rte. 1, 115 Muskie Trail, Morris, Ill. 60450

[21] Appl. No.: 732,586

[22] Filed: Oct. 15, 1976

[51] Int. Cl.² .............................................. B23K 9/12
[52] U.S. Cl. ................................. 219/137.2; 219/136; 226/181; 219/76.1
[58] Field of Search ................... 219/130, 121 R, 136, 219/137, 131 R, 125; 254/183, 139, 145, 136; 226/181, 185; 339/5 R, 5 M, 5 P, 5 S, 5 RL, 6 R, 8 R, 8 PB, 8 RL

[56] References Cited

U.S. PATENT DOCUMENTS

| 397,283 | 2/1889 | Gehring | 254/136 |
|---|---|---|---|
| 2,654,015 | 9/1953 | Landis et al. | 219/30 X |
| 2,868,956 | 1/1959 | Lobosco | 219/130 X |
| 3,317,779 | 5/1967 | Henderson | 219/130 |
| 3,526,749 | 1/1970 | Shrubsall | 219/131 R |
| 3,652,823 | 3/1972 | Clemens et al. | 219/136 |
| 3,748,435 | 7/1973 | Reynolds | 219/130 |
| 3,835,287 | 9/1974 | Jonsson | 219/130 |
| 3,964,490 | 6/1976 | Nelms | 339/8 RL X |
| 3,966,170 | 6/1976 | McKenna | 254/183 |

FOREIGN PATENT DOCUMENTS

| 4,024,362 | 1965 | Japan | 219/130 |
|---|---|---|---|
| 329,968 | 1972 | U.S.S.R. | 219/130 |

Primary Examiner—J. V. Truhe
Assistant Examiner—Mark Paschall
Attorney, Agent, or Firm—Mason, Kolehmainen, Rathburn & Wyss

[57] ABSTRACT

A drive feed roller assembly for advancing a consumable filler wire to a nozzle, or the like, in a welding apparatus. The drive roller assembly includes a plurality of individual roller segments or wafers mounted axially on a rotatable drive shaft generally concentric with the axis of rotation thereof for rotation therewith. Each roller segment has a generally concentric peripheral groove for engaging and advancing the consumable filler wire to the nozzle. Each roller segment is removable from the drive shaft for selectively interchanging the roller segments in different side-by-side arrangements axially on the drive shaft to permit placement of any one of the roller segments in position for engaging the filler wire. A clamp is provided for holding the roller segments axially on the drive shaft in any side-by-side arrangement. A backup roller is provided for engaging the filler wire on a side thereof opposite the roller segments to maintain the filler wire in engagement with the groove of a properly positioned one of the side-by-side roller segments.

5 Claims, 5 Drawing Figures

U.S. Patent  Jan. 10, 1978  4,068,106
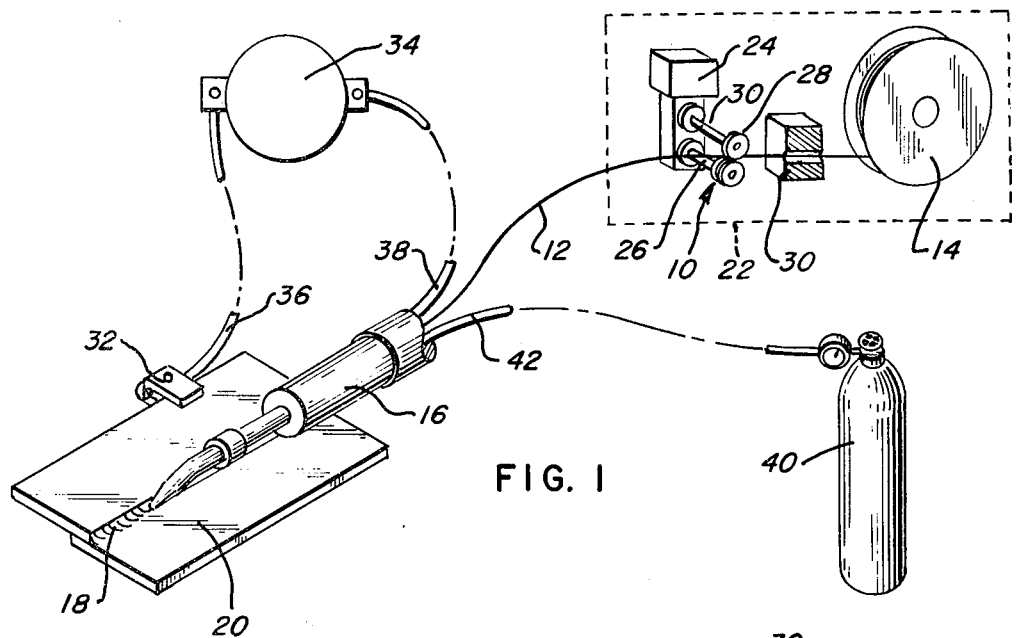
FIG. 1
FIG. 2
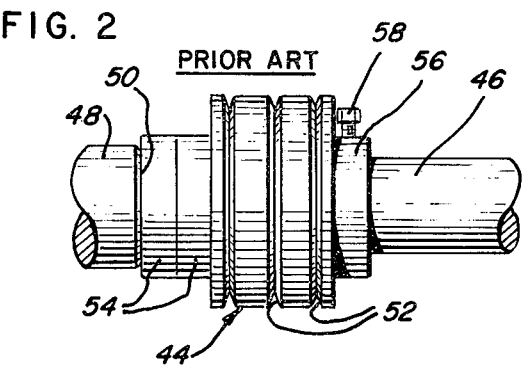
PRIOR ART
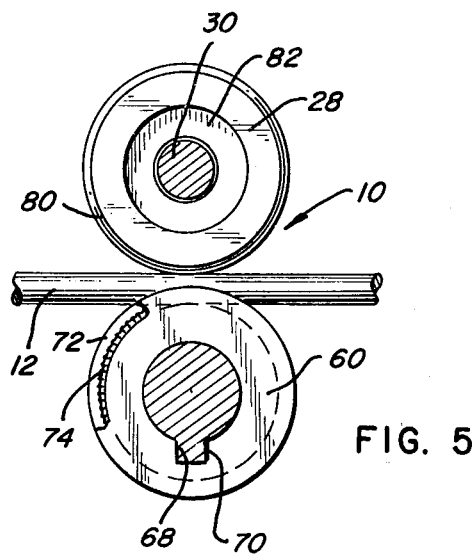
FIG. 5
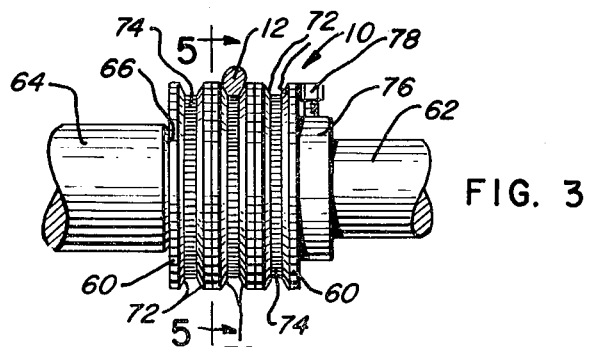
FIG. 3
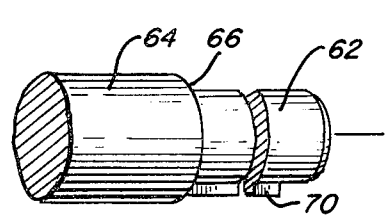
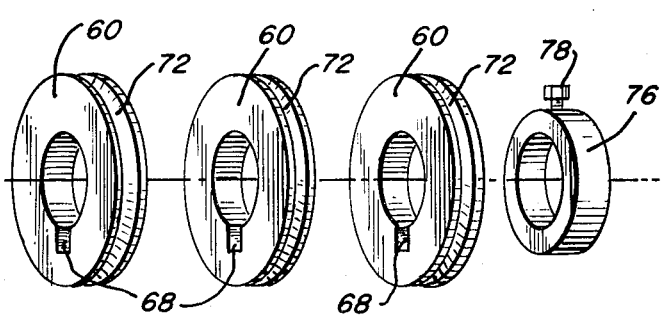
FIG. 4

WELDING APPARATUS

BACKGROUND AND SUMMARY OF THE INVENTION

This invention relates to welding apparatus and, particularly, a drive feed roller assembly for advancing a consumable filler wire to a nozzle of the welding apparatus to produce a weld on a work piece.

The form and quality of the weld in consumable electrode arc welding depends on a large number of variables, one of which is proper feeding of the filler wire to the nozzle or welding area of the apparatus. Some consumable wire feeding systems feed the wire at a rate proportional to arc voltage, usually at a constant rate. Other systems feed the consumable wire intermittently, but in most apparatus, feed rollers are provided for engaging the consumable wire to move the wire from a supply reel thereof longitudinally to the welding area. The consumable wire must be fed generally in a straight line without causing bends or kinks which could jam the apparatus as well as reduce the quality of the weld itself.

During usage, the feed rollers become worn or can be damaged whereupon they must be replaced in order to maintain a high quality feeding system of the filler wire to the weld. One form of feed roller heretofore utilized comprises a single feed roller (with a backup roller) and which has a plurality of circular grooves disposed generally parallel and axially of the feed roller. The single roller with multiple grooves is held at various set positions on a rotatable drive shaft, for instance, so as to position one of the grooves of the roller for proper engagement with the filler wire in one of the grooves. As a groove becomes worn, the axial disposition of the feed roller would be changed on the drive shaft so as to dispose another groove in position for proper engagement with the filler wire. One disadvantage with such a unitary, multiple grooved roller is that should the roller be damaged, it would have to be replaced not withstanding the fact that one or more of the multiple grooves had not even been used during operation. In addition, separate spacer members had to be provided on the drive shaft, adding cost to the apparatus, so as to maintain different axial positions of the multiple groove roller on the drive shaft.

The present invention is directed to providing a new and improved feed roller assembly for use in a consumable wire welding apparatus, without the disadvantages of the prior art as described above.

More particularly, the drive feed roller assembly of the present invention is designed for use in a welding apparatus which utilizes a consumable wire to produce a weld on a work piece, as the feed roller assembly advances the consumable filler wire to a welding area or nozzle. The apparatus includes a rotatable drive shaft on which the feed roller assembly is mounted generally concentric with the axis of rotation of the drive shaft for rotation therewith. In a form of the invention shown herein, the drive shaft has an enlarged portion defining a shoulder against which the roller assembly abuts at one end of the assembly, and a holding means in the form of a collar positioned about the drive shaft for bearing against the opposite end of the assembly, with means for releasably clamping the collar to the drive shaft.

The feed roller assembly includes a plurality of individual roller segments or wafers mounted axially on the drive shaft and each individual roller segment has a generally concentric peripheral circular groove for engaging and advancing the consumable filler wire to the weld area or nozzle of the welding apparatus. Each individual roller segment or wafer is removable from the drive shaft for selectively interchanging the roller segments in different side-by-side arrangements on the drive shaft to permit placement of any one of the roller segments in position for engaging the filler wire. An end one of the side-by-side roller segments abuts against the shoulder defined by the enlarged portion of the drive shaft and the opposite end roller segment is engaged by the holding means or clamping collar.

With a feed roller assembly of the character described and shown herein, comprising a plurality of individual roller segments or wafers, should one of the roller segments become damaged, only that segment need be replaced resulting in cost savings. In addition, should the groove on one of the roller segments become worn through usage, the plural roller segments need only be rearranged in a different side-by-side relationship so as to present the groove on another roller segment in position to properly engage the consumable wire. Thus, no spacer members need be employed on the drive shaft, due to the simple shifting and rearrangement of the roller segments.

In the form of the invention shown herein, the peripheral grooves of the roller segments are generally channel-shaped with smooth side wall portions and a bottom wall portion which is provided with a friction surface, such as a knurled surface, engageable with the filler wire.

Other objects, features and advantages of the invention will be apparent from the following detailed description taken in connection with the accompanying drawings.

BRIEF DESCRIPTION OF THE DRAWINGS

FIG. 1 is a somewhat schematic, perspective view of a welding apparatus for utilizing a consumable wire to produce a weld on a work piece, and including the new drive feed roller assembly of the present invention;

FIG. 2 is a side elevational view of a drive feed roller assembly as has been used in the prior art;

FIG. 3 is a side elevational view of a drive feed roller assembly in accordance with the present invention;

FIG. 4 is an exploded perspective view of the drive feed roller assembly of FIG. 3; and FIG. 5 is a vertical section taken generally along the line 5—5 of FIG. 3, and including a backup roller.

DETAILED DESCRIPTION OF THE PREFERRED EMBODIMENT

Referring to the drawings in greater detail, and first to FIG. 1, a welding apparatus is shown to include a drive feed roller assembly, generally designated 10, of the present invention for advancing a consumable filler wire 12 from a supply spool 14 past the roller assembly 10 to a nozzle 16 of the apparatus. A weld 18 is formed on a work piece 20 (for instance, a pair of flat metal plates as shown) by consumption of the consumable filler wire 12.

The welding apparatus of FIG. 1 is shown generally schematically so as to set the environment of the feed roller assembly 10. For instance, a housing 22 is shown by dot-dash lines for encasing the supply spool 14 for the consumable filler wire 12, along with the feed roller assembly 10. A drive motor 24 is provided in the housing 22 for rotating a drive shaft 26 which drives the feed roller assembly 10. A backup roller 28 is provided on an idler shaft 30 for engaging and maintaining the position of the filler wire 12. Since it is desirous to maintain a fixed linear path for the filler wire 12 so as to eliminate any bends or kinks in the filler wire, some sort of positionable guide means, such as a guide block 30, is provided to define a fixed position for the linear travel of the filler wire. The guide means is shown simply as the block 30 for exemplary purposes.

In consumable electrode arc welding, one electrode 32 is attached to the metal work piece 20 from an electrical source 34 by a lead line 36. A second lead line 38 extends from the electrical source 34 and is connected directly to the consumable wire 12 by any appropriate terminal means within the nozzle 16 so that the consumable wire 12 forms the other electrode of the apparatus which, during consumption, forms the weld 18 by arcing between the consumable wire and the work piece. A source 40 of inert gas is provided for supplying the inert gas through a tube 42 leading to the nozzle 16 whereby, as is conventional, the inert gas is fed to the welding end of the nozzle for shielding the weld at the weld area to prevent oxidation of the molten weld material provided by the filler wire 12.

Referring to FIG. 2, a prior art feed roller, generally designated 44, is shown provided on a rotatable drive shaft 46 having an enlarged portion 48 defining a shoulder 50. This feed roller 44 is a single unitary structure having a plurality of generally parallel grooves 52 within one of which a filler wire is received for advancing the wire to the weld area. With this unitary roller 44, spacer members 54 must be provided at one or both ends of the roller so as to properly position the roller axially on shaft 46 by sandwiching the spacers 54 between the roller and the shaft shoulder 50 so as to position one of the grooves 52 in a proper axial disposition for engaging the filler wire. A clamping collar 56 having a set screw 58 engageable with the shaft 46 is provided at the end of the roller 44 opposite the shoulder 50 to hold the roller in selected position. Not only does this unitary roller 44 have the above described disadvantage of requiring additional spacer members 54 to properly position the roller, but should the roller become damaged for some reason, the entire roller must be replaced notwithstanding the fact that one or more of the grooves 52 remain in satisfactory condition. It can be seen that with the unitary prior art roller, additional expense is required in providing spacer members 54, and the possibility exists of having to replace a defective or damaged roller regardless of the condition of one or more of the wire engaging grooves 52.

FIGS. 3 through 5 show the drive feed roller assembly 10 for engaging the consumable filler wire 12 to advance the filler wire from the supply spool 14 through the nozzle 16 to the welding area. More particularly, the drive feed roller assembly includes a plurality of separate, individual roller segments or wafers 60 mounted axially on a drive shaft 62 having an enlarged portion 64 defining a shoulder 66. Each roller segment 60 has a cutout portion 68 (FIGS. 4 and 5) for receiving a keyed portion 70 of the drive shaft 62 so that the roller segments are mounted on the shaft generally concentric with the axis of rotation thereof for rotation therewith as driven by the interengagement of the cutout portions 68 of the roller segments and the keyed shaft portion 70.

Each roller segment 60 has a generally concentric peripheral circular groove for engaging and advancing the consumable filler wire 12 from the supply spool 14 to the nozzle 16. Each peripheral groove is generally channel-shaped and has generally smooth side wall portions 72 and a bottom wall portion 74, the latter of which is provided with a friction surface, such as the knurled surfaces shown in the drawings, for engaging the filler wire 12. Holding means in the form of a collar 76 is provided for positioning about the drive shaft 62 and includes a set screw 78 for locking the collar to the drive shaft in abutment with an end one of the roller segments 60 opposite the assembly thereof away from the shaft shoulder 66. The collar 76 may be provided with a cutout portion in the center thereof (although not shown in the drawings) for engagement with the keyed portion 70 of the shaft 62.

As seen in FIG. 5, the backup roller 28 is disposed on the idler shaft 30 for engaging the filler wire on the side thereof opposite the roller segments 60 to maintain the filler wire in engagement with the groove of a properly positioned one of the roller segments. The backup roller 28 has a groove 80 for receiving the filler wire 20 and a bearing 82 such as a conventional ballbearing construction, for free rotation of the backup roller 28 as the filler wire 12 is advanced by one of the roller segments 60.

Thus, it can be seen that with the drive roller assembly of the present invention, including the separate, individual and interchangeable drive roller segments or wafers 60, different side-by-side arrangements of the roller segments on the drive shaft 62 are permitted by placing any one of the roller segments in position for engaging the filler wire 12. With this structure, it can be seen that the spacer members 54 of the prior art are eliminated because, as the groove about one of the roller segments 60 becomes worn through usage, that worn roller segment simply is shifted into a different position on the drive shaft 62 and another of the roller segments is placed in proper positioning for engaging the filler wire. In addition, should one of the roller segments 60 become damaged during use, oftentimes the damaged roller segment still can be used as a spacer means when another roller segment is moved into position for properly engaging and advancing the filler wire. The savings in the expense of the prior art spacer members 54, and the possible savings in not having to replace an entire drive roller 44 (FIG. 2), is readily apparent.

The foregoing detailed description has been given for clearness of understanding only and no unnecessary limitations should be understood therefrom as some modifications will be obvious to those skilled in the art.

I claim:

1. In a welding apparatus for utilizing a consumable filler wire to produce a weld on a workpiece, a drive feed roller assembly for advancing the consumable filler wire to a nozzle, comprising:

a rotatable drive shaft;

a plurality of individual roller segments mounted axially on said drive shaft in a side-by-side abutting arrangement and generally concentric with the axis of rotation thereof for rotation therewith, each roller segment having a generally concentric peripheral groove for engaging and advancing the consumable filler wire for advancement to said nozzle, and each roller segment being removable from the drive shaft for selectively interchanging the roller segments in different side-by-side arrangements on the drive shaft to permit placement of any one of the roller segments in position for engaging the filler wire;

an enlarged portion on said drive shaft defining a shoulder against which an end one of said side-by-side roller segments abuts;

means for holding the roller segments axially on the drive shaft in any side-by-side arrangement; and back-up roller means for engaging the filler wire on a side thereof opposite said roller segments to maintain the filler wire in engagement with the groove of a properly positioned one of said roller segments.

2. The assembly of claim 1 wherein said holding means includes a collar positionable about said drive shaft for bearing against said opposite end roller segment, and means for releasably clamping said collar to the drive shaft.

3. The assembly of claim 2 wherein the peripheral grooves of said roller segments have knurled surfaces formed at the base of the grooves entirely thereabout.

4. The assembly of claim 1 wherein the peripheral grooves of said roller segments are channel-shaped with generally smooth side wall portions and a bottom wall portion provided with a continuous friction surface engageable with the filler wire.

5. The assembly of claim 4 wherein said bottom wall portion is knurled.

* * * * *